(12) United States Patent
Zhang

(10) Patent No.: US 9,306,806 B1
(45) Date of Patent: Apr. 5, 2016

(54) INTELLIGENT RESOURCE REPOSITORY BASED ON NETWORK ONTOLOGY AND VIRTUALIZATION

(71) Applicant: Cavirin Systems, Inc., Santa Clara, CA (US)

(72) Inventor: Gordon Zhang, Cupertino, CA (US)

(73) Assignee: Cavirin Systems, Inc., Santa Clara, CA (US)

( * ) Notice: Subject to any disclaimer, the term of this patent is extended or adjusted under 35 U.S.C. 154(b) by 149 days.

(21) Appl. No.: 14/226,036

(22) Filed: Mar. 26, 2014

(51) Int. Cl.
*G06F 15/173* (2006.01)
*H04L 12/24* (2006.01)

(52) U.S. Cl.
CPC .................... *H04L 41/0853* (2013.01)

(58) Field of Classification Search
CPC .................................................. H04L 41/0853
USPC .......... 709/202, 203, 220, 223, 227, 230, 237
See application file for complete search history.

(56) References Cited

U.S. PATENT DOCUMENTS

| | | | | |
|---|---|---|---|---|
| 6,934,745 | B2 * | 8/2005 | Krautkremer | 709/223 |
| 7,185,073 | B1 * | 2/2007 | Gai et al. | 709/221 |
| 7,240,102 | B1 * | 7/2007 | Kouznetsov et al. | 709/220 |
| 8,024,771 | B2 * | 9/2011 | Malkin et al. | 726/1 |
| 8,832,239 | B2 * | 9/2014 | Assuncao et al. | 709/220 |
| 8,874,685 | B1 * | 10/2014 | Hollis et al. | 709/217 |
| 2002/0194323 | A1 * | 12/2002 | Chantrain et al. | 709/223 |
| 2005/0015622 | A1 * | 1/2005 | Williams et al. | 713/201 |
| 2006/0047800 | A1 * | 3/2006 | Caveney et al. | 709/223 |
| 2007/0143827 | A1 * | 6/2007 | Nicodemus et al. | 726/2 |
| 2009/0228579 | A1 * | 9/2009 | Sanghvi et al. | 709/224 |
| 2013/0204986 | A1 * | 8/2013 | Velupillai | 709/220 |

* cited by examiner

*Primary Examiner* — Michael Y Won
(74) *Attorney, Agent, or Firm* — Barry N. Young

(57) ABSTRACT

Configuration information describing a plurality of network devices in a multi-vendor, multi-class, multi-layer network is analyzed using an ontology analysis to create resource profiles comprising descriptions, configurations, inter-relationships and states of the network devices. Predefined network operational policies are applied to a virtual construct of the network created using the resource profiles determine compliance of the network with the policies. Configuration information is received dynamically and stored in a database to create a historical record of network configurations that can be analyzed to correlate configuration changes with operational changes.

20 Claims, 3 Drawing Sheets

INTELLIGENT RESOURCE REPOSITORY BASED ON NETWORK ONTOLOGY AND VIRTUALIZATION

BACKGROUND

This invention relates generally to analyzing and managing the configuration of resources of enterprise networks, data centers and cloud environments to determine their compliance with operational, security and other policies, to detect configuration and operational changes, and to assure their uptime.

The management of large multi-vendor, multi-class and multi-layer enterprise network infrastructures such as wide area and local area networks, data centers and cloud-based infrastructures is a complex task. Such network infrastructures may comprise a large number of different types of physical, logical and virtual resources. Because the infrastructures are subject to ongoing changes and reconfigurations, discovering, monitoring and managing infrastructure resources, configurations and operational parameters, particularly identifying resources that are added, replaced or changed is challenging. It is important to collect and maintain current, up-to-date configuration and operational information about network resources so that in the event of a failure the network can be properly restored to its previous operating condition. Moreover, it is also essential to maintain historical configuration and operational information about past changes to network infrastructures and their resources. When the operation or the performance of a network changes, questions arise as to what caused the change, when the change occurred, and who was responsible for the change. Particularly for troubleshooting performance changes that occur subtly or over a period of time, records of previous resource and configuration changes are essential to enable correlations between such changes and network performance to be made.

There are other reasons for collecting and maintaining information on network configurations and resources. Network configurations are continuously evolving and changing as new users, functions and resources are added, and improvements to resources are made. Particularly during initial configuration and startup, the system configuration and resource parameters may change repeatedly until a stable operational system state having the desired performance is achieved. Thus, it is important to save the final running network and device configurations in memory so that in the event of a failure the system can be restored easily to its previous operating state.

Still another reason for collecting and maintaining network configuration information is to enable the system configuration to be monitored for compliance with predetermined policies and standards. For instance, government or company policies and industry standards may mandate certain levels of encryption for certain types of data, such as credit card information. Other policies may preclude access to certain kinds of information, e.g., health-related information. A company may have a security policy that once their network is set up and running, access to physical HTTP or MAC network addresses is not permitted. Providing a mechanism that enables the network to be monitored to ensure compliance with such standards and policies without interfering with the normal ongoing network operations is important.

It is desirable to provide systems and methods that address the foregoing and other problems of network infrastructure management by enabling configuration information and operational parameters of network resources to be automatically detected, analyzed and stored, and to afford continuous network infrastructure monitoring and management without disrupting ongoing network operations. It is to these ends that the present invention is directed.

SUMMARY OF THE INVENTION

The invention, in one aspect, affords a system and method that comprises a resource repository for storing discovered network information about the configurations and parameters of network resources (devices) in multi-vendor, multi-class and multi-layer network infrastructures. Network devices and their attributes are discovered, identified, classified, organized, analyzed, and corresponding data is stored in the resource repository for further processing, analysis and auditing. A virtual construct of the network infrastructure may be created, and management decisions and control actions affecting network and device configurations may be first implemented and validated using the virtual construct without the necessity of accessing the actual physical network or its devices, and without any disruption of on-going network operations. After validation using the virtual construct, configuration changes and control actions may be implemented directly on the network devices in the actual network. In the event a change in the configuration state of a network device is made or occurs, the change is detected and the repository is updated either automatically or manually based on a new resource discovery process, and an assessment of the change in state may be performed.

The resource repository is designed and implemented using industry IETF/RFCs (Internet Engineering Task Force/Request For Comments) standard protocols and mechanisms to identify each network device's properties, and devices are classified into operating systems groups in accordance with their properties. Information is organized into a physical, logical or virtual format and then stored to the repository. The invention may use the results of a continuous learning process that detects, identifies, classifies and organizes discovered network resources and their runtime behaviors, and save the configuration information to the repository.

DESCRIPTION OF PREFERRED EMBODIMENTS

The invention is particularly well adapted for the discovery, analysis and management of the configuration and operational parameters of physical, logical and virtual resources in large multi-vendor, multi-class and multi-layer enterprise networks, and will be described in that environment. It will become apparent, however, that this is illustrative of only one utility of the invention and that the invention may be employed with other types of infrastructures and in other environments, such as central or distributed data centers and public, private, and hybrid cloud environments.

Prior to describing the invention in more detail, certain terms used herein will first be defined. The term "physical resources" refers to physical hardware devices and equipment such as computers, printers, routers, switches, etc. The term "logical resources" refers to software entities which are grouped logically such as VLANs, clusters, domains, server farms, and the like. The term "virtual resources" refers to virtual systems such as virtual networks, virtual switches and virtual machines, for instance. The term "multi-vendor" refers to a resource of a particular type which is available from multiple different manufacturers, such as, for instance, Cisco, Juniper and Hewlett-Packard. The term "multi-class" refers to different types of resources, such as, for instance, routers, switches, firewalls, load balancers, wireless LAN controllers, servers, etc. The term "multi-layer" refers to resources that support one or more different network protocols, such as, for example CDP (Cisco Discovery Protocol), ARP (Address Resolution Protocol), IP (Internet Protocol), TCP (Transmission Control Protocol), UDP (User Datagram Protocol), SNMP (Simple Network Management Protocol), etc., or which operate on any of Layers 2 to 7, i.e., L2 to L7, of the Open Systems Interconnection (OSI) network model of the International Organization for Standardization (ISO).

Figure 1:
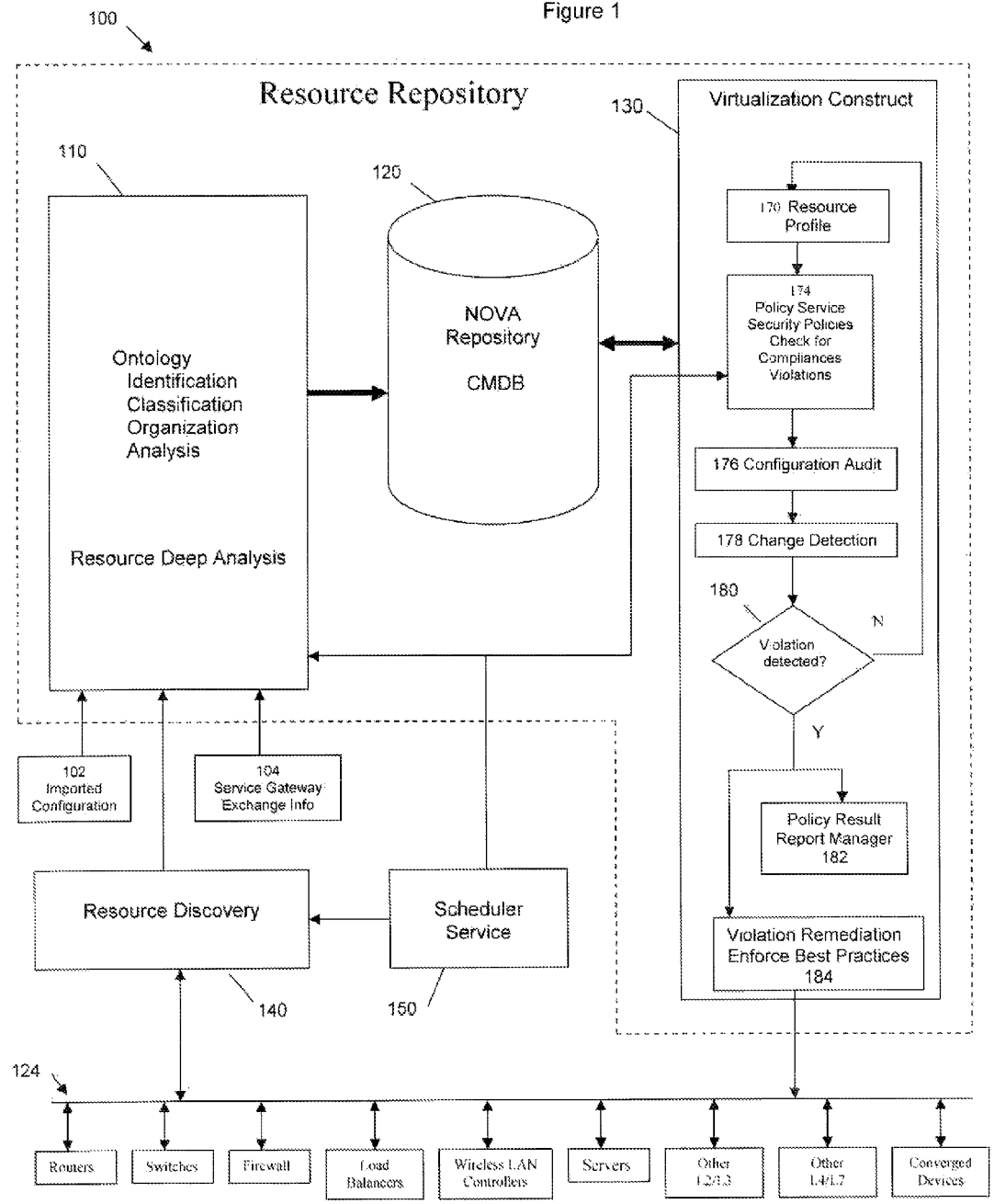
FIG. 1 is an overview of a resource discovery, repository and analysis system and method in accordance with the invention.

FIG. 1 is a diagrammatic overview of a resource repository and analysis system and method in accordance with the invention. As shown in the figure, the system and method of the invention may comprise a resource repository 100 that comprises a resource deep analysis system 110, a repository configuration management database (CMDB) 120, and a virtualization construct system 130. The resource deep analysis system 110 may receive data inputs from a resource discovery system 140 that discovers configuration information comprising the identities, attributes, configurations, and operational states and characteristics of network devices in a network infrastructure such as an Ethernet network 124. Network 124 may be part of a large enterprise local or wide area network, for example, and may comprise a plurality of network resources (devices) such as, for example, routers, switches, firewalls, load balancers, wireless LAN controllers, servers, L2/L3 devices, L4/L7 devices or other converged devices, as shown. The resource discovery system 140 may comprise the network ontology virtualization appliance (NOVA) resource discovery system and operate as disclosed in Applicant's co-pending U.S. application Ser. No. 13/970, 596, filed Aug. 13, 2013, assigned to the assignee of the present application, the disclosure of which is expressly incorporated by reference herein. As described in that referenced application, the resource discovery system 140 uses a novel process and system of the network ontology and virtualization appliance (NOVA) to discover configuration information of physical, logical and virtual resources in multi-vendor, multi-class, and multi-layer based enterprise networks, data centers and cloud environments. As used herein, the term configuration of discovered resources comprises the identities of network infrastructure resources, their interconnections and relationships with other resources in the network, and their operational parameters and states. The resource discovery system 140 may operate automatically on a set schedule under the control of a scheduler service 150, for instance, or substantially continuously to repeatedly discover network resource configurations and resource changes to maintain current updated network configuration information. It may also operate manually under the control by a user to execute a resource discovery process upon demand.

In addition to receiving configuration information pertaining to network 124 from the resource discovery system 140, the resource deep analysis system 110 may also receive imported configuration information 102 as from a user, for instance, and may additionally exchange information with third-party systems via a service gateway exchange 104. The user imported configuration information 102 may comprise multi-vendor, multi-class and multi-layer network configuration or device information for other networks, for instance, that is imported into and stored in the NOVA repository CMDB 120 for analysis. There may be, for instance, two separate networks that have the same settings and configurations running at different locations. The imported configuration input 102 allows the configuration information of the second network to be input to the resource repository 100 so that it may be analyzed and compared with the configuration of the first network (124), for example. The service gateway exchange Information 104 service may interface with third party systems to exchange information bi-directionally. In a preferred embodiment it may integrate with well-known trouble-ticketing, network management, change management and asset management platforms or solutions. Additionally, the service gateway may be used to import resource specifications, configurations and policies of third-party companies into the resource repository. Since the resource repository 100 may run as an independent service in a centralized or distributed manner, it may read and analyze imported configurations collected from other network environments, compare the imported network configurations against predetermined policies and standards, and generate appropriate compliance and violation reports. This enables, for instance, the system to import a third party's network configuration information, analyze it against that party's policies, and report the results of the analysis to the third party. The gateway also allows configuration information to be exported from the resource repository system for other purposes.

The resource deep analysis system 110 of the resource repository system 100 may be a computer processing system comprising a computer, associated computer readable non-transitory storage media for storing instructions for controlling the computer to perform the ontology analysis and operations described herein, and associated I/O and network interfaces. As indicated in FIG. 1, and as will be described in more detail below in connection with FIG. 2, the resource deep analysis system 110 may perform ontology analysis on the input information from the resource discovery system 140, from imported configurations 102, and from the service gateway exchange 104, and identify network devices by types such as routers, switches, firewalls, etc., based upon their functional features; classify devices into different groups such as a router group, a switch group, a firewall group, a Windows group, a wireless group, etc., based upon their device types; organize and label information in either an as-is or pick-and-choose manner such as through the creation of a network build; and analyze information to resolve relationships from network layer L2 to layer L7 such as port-to-port or application-to-application correlations. The results of this ontology analysis may be stored in the CMDB 120 as tokenized configuration files for the network resources. These files may be retrieved for further analysis by the virtualization construct system 130, as will be described, and used to create and provide a multi-dimensional, virtual representation of network with the dynamic and complex physical and logical inter-relationships among the entity types that comprise the network.

Figure 2:
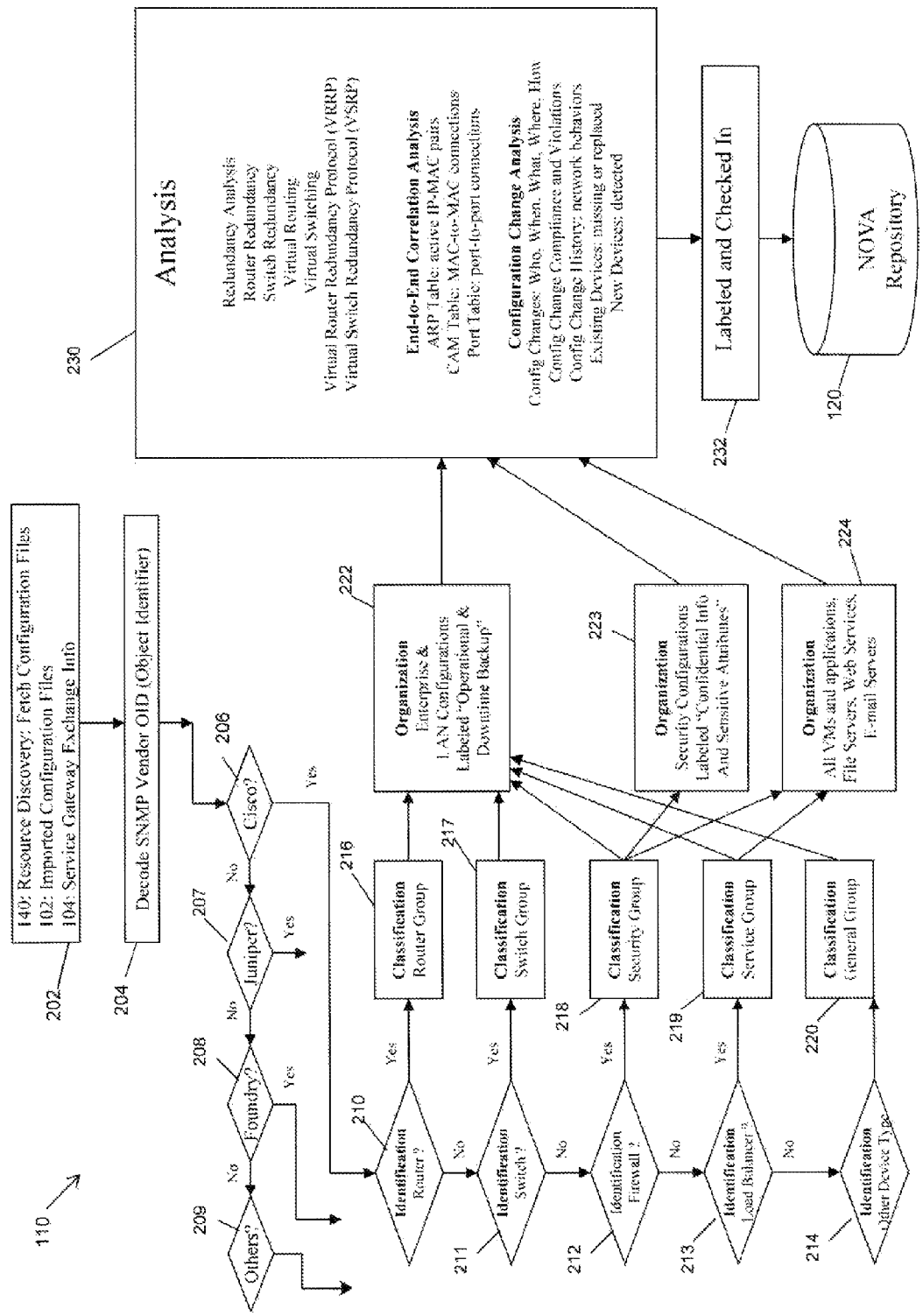
FIG. 2 is a block diagram illustrating in more detail a resource analysis method in accordance with the invention.

FIG. 2 illustrates a process that may be used by the resource deep analysis system 110 for the ontology analysis. As shown, input data 202 from the resource discovery system 140, imported configuration files 102 and service gateway exchange 104 may be decoded at 204 to determine SNMP vender object identifiers (OID) that indicate the vendor (i.e., manufacturer) of a device associated with the input information. The OIDs and associated information may be supplied to a series of decision steps 206-209 that separate the information for additional processing by manufacturer, e.g., Cisco, Juniper, Foundry or another, and supply it to an associated series of identification, classification and organization processes. The decision steps 206-209 may be organized serially in decreasing order of popularity or importance of network device manufacturers. The most popular manufacturer of network devices may be, for example, Cisco Systems, Inc., so that the first step 206 separates out information on Cisco devices. If decision process 206 recognizes that the manufacturer OID is for Cisco, the information is supplied to a series of identification processes 210-214 that identify the type of device such as a router, switch, firewall, load balancer or other device based upon the functional features of the device as provided in the information. The identification processes may also be organized serially, based upon the commonality of device type from that manufacturer. Once the device type has been identified, the information may next be classified into a classification group 216-220 such as router group 216 based upon device type, switch group 217 based on operating system, for instance, security group 218 based upon security configurations, etc. If instead at 206 the OID is not for Cisco, the OID may be supplied to the next process 207 where it is checked for another vendor/manufacturer, for example Juniper Networks. If the vender OID is Juniper, the process will branch to another appropriate set of identification, classification and organization processes for Juniper (not shown). Otherwise the process continues and repeats for other vendors until the vendor is identified.

Following the classification processes 216-220, the data may be supplied to one or more organization processes 222-224, as shown, where the information is organized. After it is organized, it may be analyzed at 230, as indicated in the figure, labeled and checked in at 232, and stored in the repository 120. At 230, a number of different analyses may be performed, as indicated in FIG. 2, and the results used to label (tokenize) and store the data in the repository.

The resource deep analysis processing system 110 processes its input configuration information to derive a plurality of configuration items ("CIs") that characterize design and operational details about network devices, their network configurations, their inter-relationships, and their past history. Examples of configuration items are described below. These CI's and related configuration information may be formatted into a predetermined storage format used by the repository CMDB database 120, labeled and checked into (stored) in the repository CMDB database. Examples of preferred information which may be derived, formatted and stored as configuration items (Cis) include:

a. CI ID: CI identifier such as a discovered device ID
   b. CI Make: CI vendor
   c. CI Category: CI type
   d. CI Model Number: CI model number
   e. CI Serial Number: CI serial number
   f. CI Version Number: Software version running on CI
   g. CI Source Supplier: CI provider
   h. CI Relationship: Relationships between CIs such as application running on server or client connecting to server.
   i. CI Location: CI location
   j. CI Ticket Number: CI ticket number of an incidence
   k. CI Description: CI description
   l. CI Part Number: CI part number
   m. CI Software License Number: CI software license number
   n. CI Owner Responsible: The person who responsible for controlling quality and accuracy of the CI
   o. CI Customer: CI customer who requires CI information
   p. CI Date Acquired: Date when CI was acquired
   q. CI Status: CI current status such as Accepted, Installed, Registered, Under Development, or Withdrawn
   r. CI Next Maintenance Window: Next time CI is to be reviewed, updated, and modified
   s. Timestamp: When the CIs were created or edited.

The storage format of the database 120 may be organized into tables comprising pluralities of rows and columns, one row per network device or resource, with each row having a plurality of fields corresponding to the columns, one for each configuration item, CI, with the value of the CI stored in the corresponding field on the row for the network device. This affords an efficient and secure networking repository for storage and easy retrieval of the discovered information. Because the repository is constantly updated and all information is time stamped, CMDB users may easily understand the relationships among the CIs (configuration items) and track device configuration changes as a function of time. This allows correlations to be made readily between observed changes in network operation and device or network configuration changes, and facilitates network management and troubleshooting.

The virtualization construct system 130 may comprise a processing system comprising a computer and computer readable storage comprising non-transitory media storing instructions for controlling the operation of the computer to perform processes in accordance with the invention. This may be the same computer system that handles the resource deep analysis 110, or a different computer system. One such process comprises determining whether a network configuration complies with applicable policies and standards. This may be done both by analyzing an actual real network and comparing its configuration to the applicable standards and policies stored in the database. Preferably, however, the invention advantageously allows analyzing and comparing a virtual construct of a real network to the applicable standards and policies.

Figure 3:
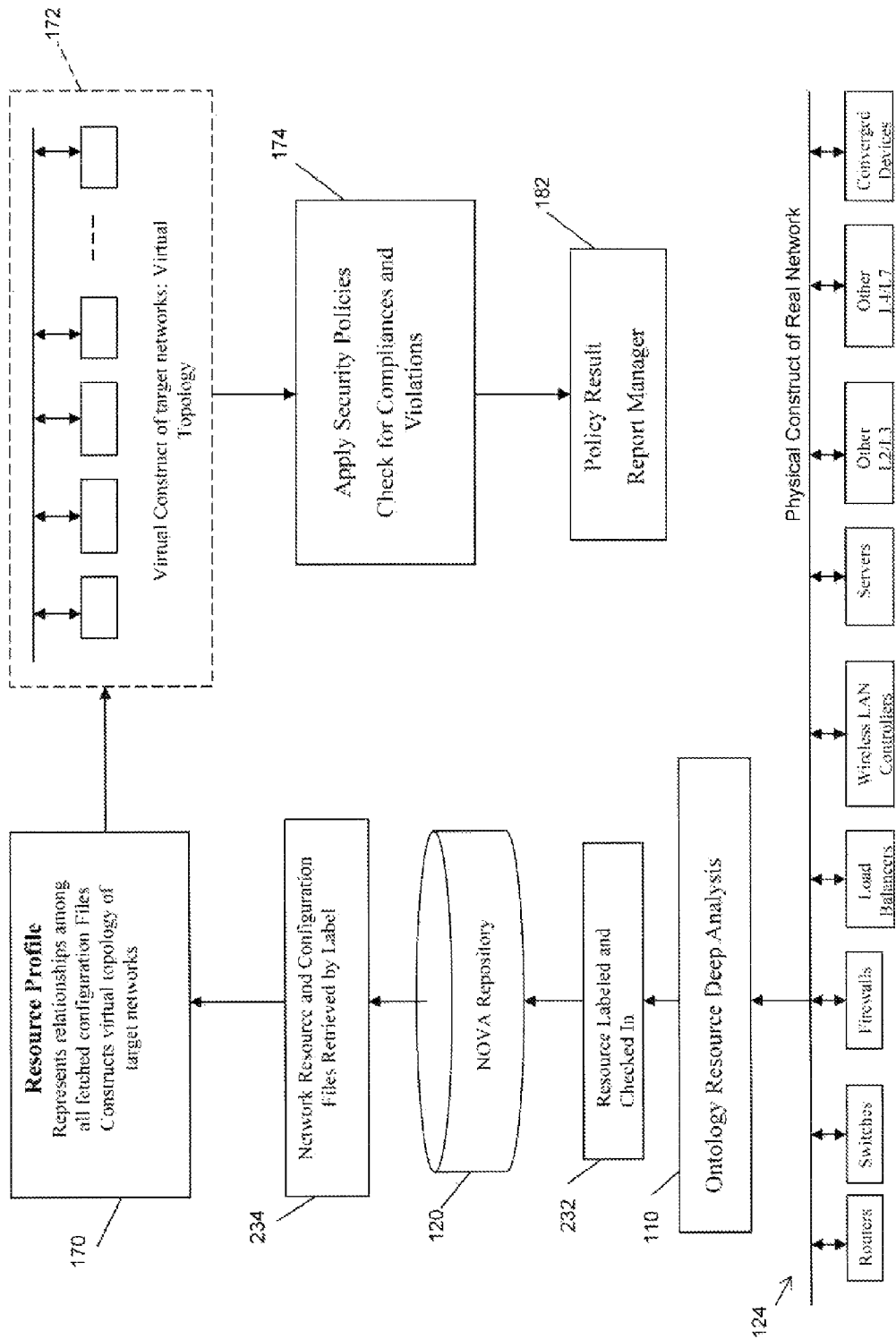
FIG. 3 is a block diagram illustrating an overview of an analysis of a virtualization resource profile.

Referring to FIG. 3, after network 124 resources have been discovered and analyzed 110, labeled 232, and their configuration files stored in NOVA repository database 120. The configuration files may be retrieved at 234 using their labels by the virtual construct system 130 and used to generate one or more resource profiles 170. The resource profiles comprise detailed descriptions of discovered resources, their configurations, their relationships, and their status. The resource profiles may be stored in the database and used to form and provide one or more virtual constructs 172 (representations of relationships among devices described by the configuration files) of the network (see FIG. 3). Security or other policies may be applied by a policy service 174 (see FIGS. 1 and 3) to the virtual construct to determine whether the corresponding real network represented by the virtual construct is in compliance with the policies. The results may be reported by a report manager 182. Examples of industry standard security policies are, for instance, the PCI-DSS Payment Card Industry Data Security Standard established by the Payment Card Industry Security Standards Council which prescribes a certain level of data encryption that applies to all organizations which store, process and transmit consumer credit card data, and the privacy policies established U.S. government regulations for health information by the Health Insurance Portability and Accountability Act ("HIPPA"). The applied policies may also be specific to a company or to an organization.

The virtualization construct system 130 also allows users to monitor and manage the network resource configurations efficiently. Resource profiles indicate which network resources have been connected to other networking entities at different times by timestamps. Resource profiles and configurations can be labeled, time stamped, and stored as separate entries in the CMDB, thereby providing a historical record of the network configuration changes over time. This allows correlations to be made between configuration changes and changes in network operation.

After the resource profiles and target network configurations as well as the operational states with their timestamps have been labeled and stored in repository database 120, their labels can be used to retrieve resource profiles, construct corresponding virtual network configurations, and present topology (network connection map) representations. In other words, the system can track and rebuild network topologies virtually using the indexed labels and timestamps without physically accessing the real network again. In case of a network failure, users can restore the network to a previous operational state at a predetermined day and time using the labels and timestamps. Furthermore, users can apply the policies to the virtual topologies' configurations to determine past compliance and any violations. If any problems are detected, a user can access the problematic devices and fix the problem. As a result, the virtualization process of the invention advantageously affords not only backup and restore of a network and resource configurations, but also allows off-line analysis which reduces network traffic and minimizes impacts and disturbances on network devices.

As may be appreciated, the CMDB 120 may be updated automatically with configuration information each time the process is executed, and may also be updated manually by users as well, and may be used for version control. The database may store the policies and standards that are applied by the police service 174. Additionally, the database may also store templates representing benchmarks network configurations that comply with certain policies and standards, and these may be used by network administrators to set up initial or other network configurations.

Referring again to FIG. 1, the virtualization construct system 130 may additionally perform a configuration audit on a network configuration, as shown at 176. Any configuration deviations or changes may be detected, as indicated at 178. In the event that a violation is detected, at 180 the policy result report manager 182 and a violation remediation process 184 may be invoked. Report manager 182 may report any policy violations, and appropriate remediation steps may be taken at 184 to correct the violations.

US government regulations, for example, require that certain networking environments and configurations be audited regularly to ensure that they are compliant with networking standards and security. Therefore, companies and organizations must define best practice network policies and enforce them to ensure compliance with applicable regulations. The virtualization construct system component 130 facilitates this. Users can create and apply multiple sets of security and other policies and standards to the resource configurations stored in the CMDB repository to check for compliance and to detect inconsistencies and violations. If no violations are detected, then compliancy reports may be generated by the report manager at 182 (FIGS. 1 and 3). If violations are detected, then violation reports may be generated with details by the report manager. The report manager may generate, manage, display and export predetermined and customized reports, such as management reports, technical reports and compliance reports, for example. Each report may be constructed to provide the type of information the level of detail desired.

The configuration change detection process 178 of the virtualization construct system 130 may detect resource configuration changes either by receiving a configuration change events message or a sysLog message reporting configuration changes of a device. Configuration changes may also be determined by the resource discovery process 140 in response to regularly scheduled configuration updates by the scheduler service 150 or upon user command. When a resource configuration change is detected at 178, it may be compared with a previous validated configuration baseline stored in the database to determine violations. For instance, a current startup configuration may be compared with a previous startup configuration; a current running configuration may be compared with a previous running configuration; or a current startup configuration may be compared with the current running configuration.

The policy violations remediation process 184 may correct for violations. This may be done, for example, by rolling back the operational configuration of target devices to a previous configuration that was in compliance. Upon completion, the remediation process may supply an operation completion event message to an event handler to inform users.

The discovered resource configurations can be manually or automatically archived and stored in the repository database, and these operational networking configurations can be labeled and served with version control to create network build as backup. In case of network failure, the rollback capability enables users to restore their networks to the previous operational state. Intelligent adaptive configuration templates that have been validated, benchmarked and approved may be used to ensure compliance with operational and regulatory policies. If configuration change violations are detected or an audit fails, users may manually or automatically address the problems through established best practices.

Network configuration compliances and violations can also be monitored and traced in real time at runtime using scheduler-based or event-driven monitoring on specified or audited device configurations to ensure that configuration changes are to comply with the regulatory standards. The logging record timestamps provide traceability and tractability.

While the foregoing has been with reference to particular preferred embodiments of the invention, it will be appreciated that changes may be made to these embodiments without departing from the principles and spirit of the invention, the scope of which is defined in the appended claims.

The invention claimed is:

1. A method of managing a multi-vendor, multi-class, multi-layer network having a plurality of network devices, comprising:
    discovering configuration information and attributes describing said network devices;
    discovering a network configuration comprising interconnections of said network devices;
    analyzing the configuration information and attributes using an ontology analysis to create resource profiles of said plurality of network devices, said resource profiles comprising a description, an address, a device configuration and an operating state of each network device;
    forming a current virtual construct of said network using said resource profiles, said current virtual construct comprising a virtual representation of the network configuration of said network devices at a current time;

applying predefined network operational policies to said current virtual construct and determining compliance of the network represented by said current virtual construct with the predefined network operational policies; and discovering changes in said network by comparing said current virtual construct with another virtual construct of said network based upon stored resource profiles of said network devices.

2. The method of claim 1, wherein said network operational policies comprise one or more of security policies, company policies, and government policies.

3. The method of claim 1, wherein said applying comprises applying a policy to a network device that is tailored to a vendor of said network device.

4. The method of claim 1, wherein said configuration information and attributes of network devices comprise identities, types, and operational states of the network devices.

5. The method of claim 1, wherein said interconnections or said network devices comprise one or more of port-to-port interconnections or application-to-application correlations.

6. The method of claim 1, wherein said analyzing comprises deriving a plurality of configuration items from said configuration information of said network devices, said configuration items comprising specific operating parameters of said network devices that form said resource profiles.

7. The method of claim 6 further comprising identifying the network devices by device type from ones of said configuration items that indicate functional features of the network devices, and classifying the devices into different groups based upon device type or device operating system.

8. The method of claim 6 further comprising storing said resource profiles as configuration files in a database, said virtual construct being formed from said stored configuration files.

9. The method of claim 6 further comprising dynamically repeating at different times said discovering of said configuration information to form a plurality of updates to said configuration information, and said storing comprises storing said updates in said database with time stamps indicating the time each update was formed, thereby creating a historical record of stored network configurations at different times.

10. The method of claim 9, wherein said applying comprises applying said operational policies to selected stored network configurations that characterize said network at the different times said selected network configurations were stored.

11. The method of claim 9 further comprising comparing said stored network configurations to identify a network configuration change associated with a change in network operations.

12. The method of claim 11 further comprising analyzing configuration items of said network configuration change to determine details of said network configuration change.

13. Computer readable non-transitory media embodying instructions for controlling the operation of a computer to manage a multi-vendor, multi-class, multi-layer network having a plurality of network devices, comprising instructions for:

discovering configuration information and attributes describing said network devices;

discovering a network configuration comprising interconnections of said network devices;

analyzing the configuration information and attributes using an ontology analysis to create resource profiles of said plurality of network devices, said resource profiles comprising a description, an address, a device configuration and an operating state of each network device;

forming a current virtual construct of said network using said resource profiles, said current virtual construct comprising a virtual representation of the network configuration of said network devices at a current time;

applying predefined network operational policies to said current virtual construct and determining compliance of the network represented by said current virtual construct with the predefined network operational policies; and discovering changes in said network by comparing said current virtual construct with another virtual construct of said network based upon stored resource profiles of said network devices.

14. The computer readable non-transitory media of claim 13, wherein said analyzing comprises deriving a plurality of configuration items from said configuration information of said network devices, said configuration items comprising specific operating parameters of said network devices that form said resource profiles.

15. The computer readable non-transitory media of claim 14 further comprising instructions for identifying the network devices by device type from ones of said configuration items indicating functional features of the network devices, and instructions for classifying the devices into different groups based upon device type or device operating system.

16. The computer readable non-transitory media of claim 13 further comprising instructions for storing said resource profiles as configuration files in a database, and instructions for forming said virtual construct from said stored configuration files.

17. The computer readable non-transitory media of claim 16 further comprising dynamically repeating at different times said discovering of said configuration information to form a plurality of updates to said configuration information, and said storing comprises storing said updates in said database with time stamps indicating the time each update was formed, thereby creating a historical record of stored network configurations at different times.

18. The computer readable non-transitory media of claim 16 further comprising instructions for comparing said stored network configurations to identify a network configuration change associated with a change in network operations.

19. The computer readable non-transitory media of claim 18 further comprising instructions for analyzing configuration items of said network configuration change to determine details of said network configuration change.

20. A system for managing a multi-vendor, multi-class, multi-layer network having a plurality of network devices, comprising:

an ontology analysis processing system for discovering a network configuration comprising interconnections of said network devices and configuration information and attributes that describe said network devices, and for creating resource profiles comprising descriptions, configurations, interconnections and operational states of each of said network devices, said processing system operating to identify and classify each network device by device type based upon said resource profiles;

a database repository for storing said resource profiles;

a virtualization construct processing system for forming a current virtual construct of said network using said resource profiles, the current virtual construct representing the network configuration of said network devices at said current time, the current virtualization construct processing system being formed for applying predefined security policies and standards to said current virtual construct, and being formed for determining and reporting changes in the network by comparing said current virtual construct with another virtual construct of said network at a different time based upon said stored resource profiles.

\* \* \* \* \*